US006918132B2

(12) United States Patent
Gargi

(10) Patent No.: US 6,918,132 B2
(45) Date of Patent: Jul. 12, 2005

(54) DYNAMIC INTERFACE METHOD AND SYSTEM FOR DISPLAYING REDUCED-SCALE BROADCASTS

(75) Inventor: Ullas Gargi, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 530 days.

(21) Appl. No.: 09/882,314

(22) Filed: Jun. 14, 2001

(65) Prior Publication Data

US 2002/0194591 A1 Dec. 19, 2002

(51) Int. Cl.$^7$ .......................... G06F 3/00; G06F 13/00; H04N 5/445
(52) U.S. Cl. .......................... 725/45; 725/41; 725/44; 725/47; 348/564
(58) Field of Search ............................. 725/41, 44, 45, 725/42, 46, 61, 40, 37, 43, 47; 348/563, 564, 569, 570, 732; 345/788, 789, 790, 791, 794, 796, 797, 667, 670, 629, 838

(56) References Cited

U.S. PATENT DOCUMENTS

| 537,029 A | * | 4/1895 | Gabel .......................... 422/150 |
| 4,855,833 A | | 8/1989 | Kageyama et al. .......... 358/183 |
| 5,559,549 A | | 9/1996 | Hendricks et al. .............. 348/6 |
| 5,926,230 A | | 7/1999 | Niijima et al. ............... 348/564 |
| 6,147,714 A | * | 11/2000 | Terasawa et al. ............ 348/564 |
| 6,163,345 A | * | 12/2000 | Noguchi et al. ............. 348/564 |
| 6,236,395 B1 | * | 5/2001 | Sezan et al. ................. 345/723 |
| 6,388,715 B1 | * | 5/2002 | Eggen et al. ................ 348/569 |
| 6,405,371 B1 | * | 6/2002 | Oosterhout et al. ........... 725/39 |
| 6,421,067 B1 | * | 7/2002 | Kamen et al. ............... 345/719 |
| 6,425,129 B1 | * | 7/2002 | Sciammarella et al. ....... 725/38 |
| 2002/0054017 A1 | * | 5/2002 | Agata et al. ................. 345/157 |
| 2002/0056098 A1 | * | 5/2002 | White .......................... 725/39 |

FOREIGN PATENT DOCUMENTS

| EP | 0725538 A2 | 8/1996 |
| EP | 1001628 A1 | 5/2000 |
| EP | 1024661 A2 | 8/2000 |
| EP | 1026887 A2 | 8/2000 |
| EP | 1052849 A1 | 11/2000 |

* cited by examiner

*Primary Examiner*—Ngoc K. Vu

(57) ABSTRACT

Selecting from currently available television programs or other commercial broadcasts is enabled by clustering the broadcasts on the basis of program categories and by simultaneously displaying video information from all of the broadcasts. The channels through which the commercial broadcasts are received are monitored in order to detect any changes in program categorization. Thus, the clustering of the broadcasts is dynamic with respect to the number of broadcasts in the different clusters. Each broadcast is displayed as a reduced-scale presentation that is based upon the video information specific to the broadcasts. In one embodiment, at least one of the clusters can be split into sub-clusters, such as splitting a movie cluster or a sports cluster on the basis of genres. Optionally, the different reduced-scale presentations are continuously updated, other than during commercial times.

19 Claims, 5 Drawing Sheets

DYNAMIC INTERFACE METHOD AND SYSTEM FOR DISPLAYING REDUCED-SCALE BROADCASTS

TECHNICAL FIELD

The invention relates generally to browsing currently available commercial broadcasts and more particularly to channel selection methods and systems which enable simultaneous viewing of accessible channels.

BACKGROUND ART

For many years, it was relatively easy to check television listings within a local newspaper in order to determine which television programs were presently being presented. There were only a few major networks and only large market areas had access to channels other than those that were affiliates of the major networks. Since the number of channels was limited, a viewer without a newspaper could quickly browse the currently available programs by manually or remotely tuning a television through the succession of channels.

The introduction of broadband television has greatly increased the program selection for television viewers. In addition to an increase in the number of major networks, there are special-interest networks, subscription channels that can be accessed for a monthly or yearly fee, and pay per view channels that can be accessed on a program-by-program basis. As a result of the proliferation of available channels, it has become more difficult and time consuming to determine which programs are currently being presented.

Techniques for simplifying the channel selection process are known. For example, in U.S. Pat. No. 5,559,549 to Hendricks et al., a television program delivery system allows viewers to select television programs from a series of menus. The primary components of the system are a main operations center, a digital cable headend, and at least one set top terminal having a remote control. The set top terminal is connected to the television of a viewer. The system uses digital compression techniques to allow a large number of television signals to be transmitted to the set top terminal. A combined signal is transmitted over satellite to the digital cable headend, which may modify the combined signal for changes or additions in programming or menu content. A number of different types of menus may be formed from the information included within the television signals received by the set top terminal of the viewer. A remote control unit having icon buttons allows the viewer to select programs based upon a series of major menus, sub menus, and program menus. Data gathering and analysis techniques may be used to compile programs-watched information that is used in packaging programs, customizing menu selections, targeting advertisements, and maintaining account and billing information. The menus may divide the channels into categories such as sports, movies, children, documentaries, and specialty channels.

Another approach is described in U.S. Pat. No. 5,926,230 to Niijima et al. According to this approach, nine reduced screens of different programs are arranged in a three-by-three matrix to construct one multi-screen arrangement for program selection. The screen for program selection is produced by multi-screen production circuits and is encoded by MPEG video encoders. Such screens are multiplexed by a multiplexer, so that they may be transmitted via a single transmission channel. The resultant signal is transmitted to an artificial satellite through a mixer and an antenna. Each multi-screen is received on a reception side from the satellite and is displayed as a three-by-three piece of a screen of full motion. A viewer can determine and directly select a desired program from a preview screen formed from the different reduced screens. Thus, at the broadcasting side of the system, the screens of available channels are multiplexed and then transmitted via a single transmission channel. On the reception side, the screens for program selection are received without the necessity of changeover of a transmission channel, so that a desired program can be selected from the large number of displayed programs. As in Hendricks et al., the Niijima et al. system may arrange available channels on the basis of categories, such as sports and movies.

As a third approach, but one that does not enable program categorization, Kageyama et al. describes a television channel selection apparatus that employs a multi-picture display. In one mode of the apparatus, an array of miniature pictures corresponding to the respective channels is displayed. Other than one channel, the miniature pictures are static. However, each channel is sequentially selected for a predetermined interval during which image data for the selected channel is written into the region of the display that corresponds to the channel. More specifically, the image data for the selected channel is written into the corresponding region of a one-field memory, with the entire memory contents being continuously and repetitively read out. As a consequence, the picture for the selected channel appears as a moving picture, while those pictures of the other channels are static. In the normal operating mode of the apparatus, the channel that is selected at the time of a mode changeover is televised in isolation.

The various approaches facilitate the viewing and selecting of programs from available channels. However, the number of channels that can be simultaneously viewed is limited. Moreover, each approach has its associated shortcoming. For example, in Niijima et al., the various screens must be encoded by MPEG video encoders and multiplexed, with the multiplexed signal requiring transmission via a satellite and requiring processing at each receiving location. For Kageyama et al., the limited amount of processing that is enabled at the receiving end may not provide satisfactory information for some users.

What is needed is a method and system for locally viewing and selecting among currently available commercial broadcasts, with the capability of simultaneous display.

SUMMARY OF THE INVENTION

Currently available commercial broadcasts, such as television programs, are clustered on the basis of program categories and are simultaneously displayed in the clusters on a single viewing screen. The channels through which the commercial broadcasts are received are monitored to detect changes in program categorization, so that the clustering is dynamic with respect to the number of commercial broadcasts in the different clusters. Each commercial broadcast is displayed as a reduced-scale presentation that is based on the video information of the commercial broadcast.

In addition to the clusters being dynamic with respect to the number of reduced-scale presentations in each cluster, the number of clusters may vary in the preferred embodiment, since there may be times at which no commercial broadcast fits within a particular program category. Each cluster corresponds to a specific program category, such as sports, movies, news and comedy. Preferably, at least some of the clusters can be divided into sub-clusters on the basis of genres. As one example, a viewer may split the sports cluster into sub-clusters that are specific to particular sports (e.g., American football and baseball). As another example, a movie cluster may be divided into subcategories of drama, action, comedy and other.

The reduced-scale presentations are preferably continuously updated, so that real time video broadcast information is simultaneously displayed for all of the commercial broadcasts. Within clusters having a large number of reduced-scale presentations, the presentations are likely to be overlapping. In one embodiment, all clusters having more than one associated commercial broadcast have overlapping reduced-scale presentations. The order of the presentations within a cluster may be cycled, so that each presentation is periodically displayed as the apparent foremost presentation in the cluster. For example, the cycling may occur not only within an "activated" cluster, with the apparent lowermost presentation being "moved" to the top at a rate of once per two seconds.

As an alternative to continuously updating the video broadcast information, at least some of the reduced-scale presentations may have fixed displays between periodic updates. As one feature, the method and system may include commercial filtering, so that the reduced-scale presentation of a program that is within a commercial advertisement continues to display the video information of the regularly scheduled broadcast, rather than the commercial.

As another feature of the invention, historical information regarding prior selections by a user is stored in memory that is accessed and used by a video processor in the display of the reduced-scale presentations. For example, the clusters may be arranged by the video processor according to user preferences, by tracking prior user selections. In another example, the reduced-scale presentation that appears foremost in a cluster of overlapping presentations is the one that has been previously selected by the particular user. Optionally, the entire collection of overlapping presentations in each cluster may be ranked according to prior selections.

An advantage of the invention is that a simultaneous display of reduced-scale presentations allows a user to quickly and easily view the different commercial broadcasts that are currently available. The categorization may be based upon known techniques, such as monitoring the tags that identify program information within digital television signals. Thus, additional circuitry for program identification would not be required. Another advantage is that for embodiments in which commercial filtering is implemented, the reduced-scale presentations would provide continuous visual information of the program that is offered on a channel. The channel selection may be triggered using a conventional television remote control device. Similarly, the user may browse through the different clusters and the presentations within the clusters by manipulating buttons on a conventional remote control device.

DETAILED DESCRIPTION

Figure 1:
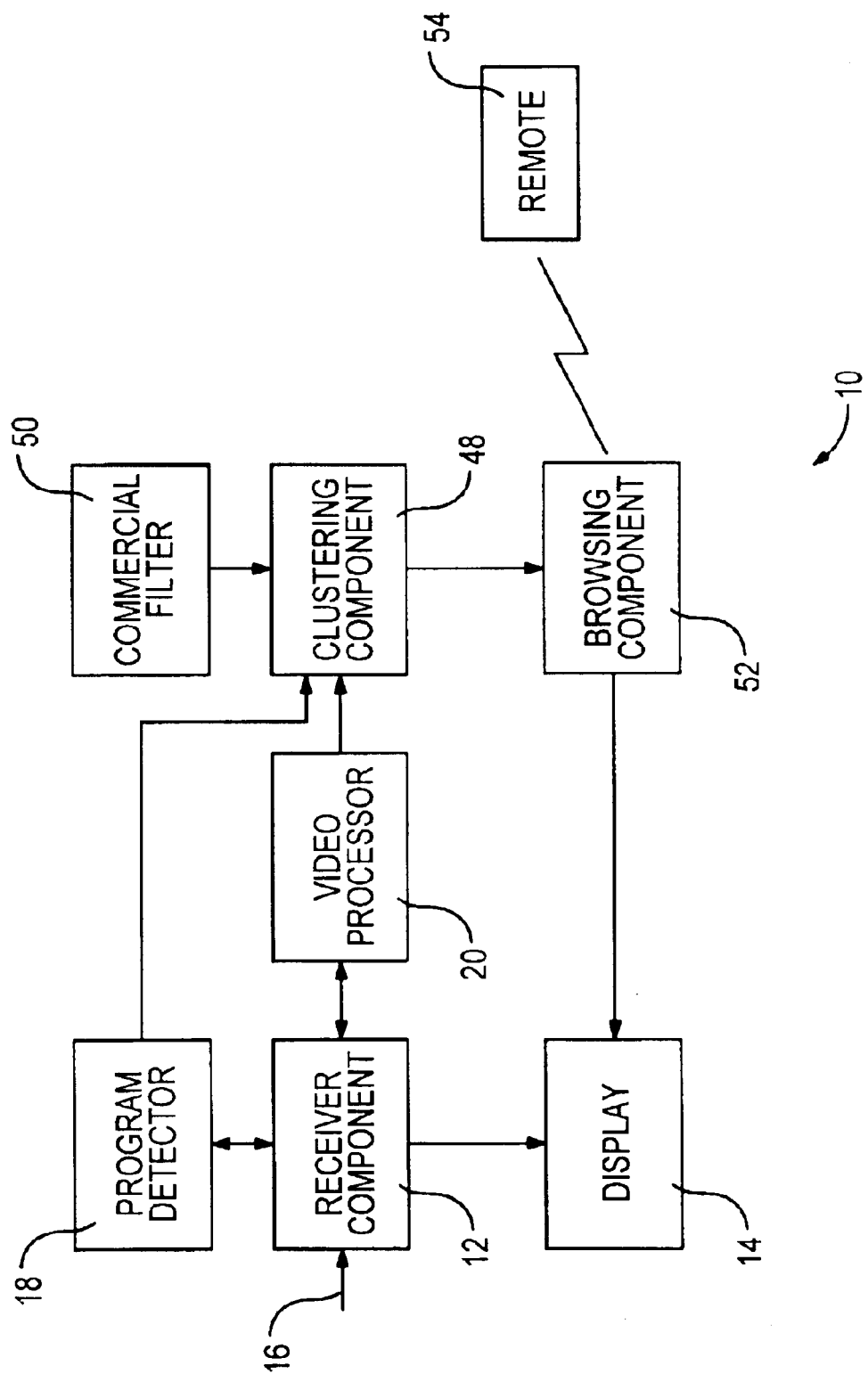
FIG. 1 is a block diagram of components for enabling dynamic program clustering in accordance with one embodiment of the invention.

With reference to FIG. 1, a system 10 for viewing and selecting among a variety of currently available commercial broadcasts includes a receiver component 12. In one embodiment, the receiver component is contained within an enclosure that is separate from a display 14 that provides the viewing screen for the commercial broadcasts. For example, in one embodiment, the receiver component is a digital cable box having an input 16 from a remotely located digital television signal provider. As alternatives, the receiver component may be connected to an antenna input and/or the receiver component may be integrated into the display, such as, a tuner of a conventional television. An advantage to the embodiment in which the input is a connection to a digital signal provider is that digital signals are often provided with header information, such as tags, which identify the currently available programs.

The system 10 also includes a program detector 18. Typically, the program detector may be integrated with the receiver component, but this is not critical. The program detector monitors the signals that are received via the input 16. Thus, if the signals are digital signals having program tags, the detector merely reads the tags to determine information regarding each channel. The above-cited patent to Hendricks et al. describes header information of this type. In accordance with the invention, the header information can be used to provide text menus of the type described in Hendricks et al. and can be used to provide video presentation clustering of the type that will be described below, when reference is made to FIGS. 2–4.

The receiver component 12 is capable of cooperating with the display 14 to select and present a channel of interest to a user. The type of display 14 is not critical to the invention. Consequently, the display may be compatible with receiving either or both of analog signals and digital signals.

Figure 2:
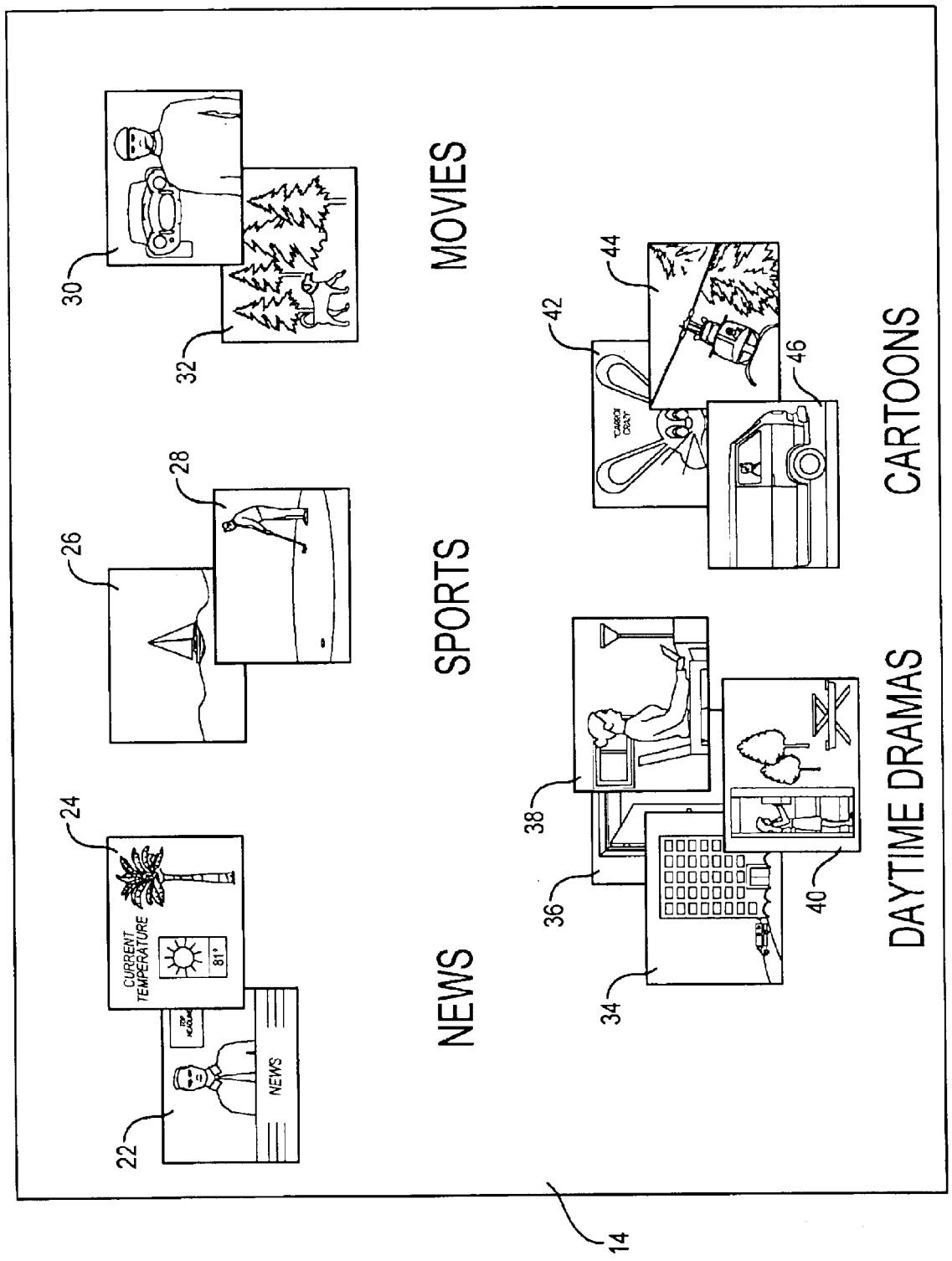
FIG. 2 is an example of a viewing screen having clustered real time program presentations in accordance with the invention.

A video processor 20 is used to generate reduced-scale presentations of each currently available commercial broadcast. That is, rather than a full-screen presentation, the vertical and horizontal dimensions of each video signal presentation are reduced. Referring to FIG. 2, thirteen reduced-scale presentations 22, 24, 26, 28, 30, 32, 34, 36, 38, 40, 42, 44 and 46 are shown on the viewing screen of the display 14. Within the selection mode of FIG. 2, the reduced-scale presentations may all be continuously updated. In this embodiment, real time video information is shown for each of the thirteen programs represented in the figure. As an alternative embodiment, the video information within each reduced-scale presentation may represent a periodic update, so that the presentations are stills that are recurringly refreshed. As another feature, the program information (e.g., title and times) may be included for each presentation.

The reduced-scale presentations 22–46 of FIG. 2 are generated by the video processor of FIG. 1 and are input to a clustering component 48. The clustering component also receives an input from the program detector 18. Based upon the program information from the detector 18, the clustering component associates each reduced-scale presentation with a program category. In FIG. 2, there are five program categories, i.e., "News," "Sports," "Movies," "Daytime Dramas," and "Cartoons." The specific labels are not critical, since the key feature is that the labels be compatible with the information that is available by operation of the program detector 18. If the invention is used in an embodiment in which menu information is unavailable, some program labeling may be achieved using other techniques. As one example, the consistent high speed movement of individuals within a presentation may be interpreted as indicating the program is a sporting event.

As an optional feature, the system 10 includes a commercial filter 50. Commercial filters which detect the start time of a commercial advertisement and the return to a program are commercially available and are used in devices such as video recorders. The purpose of the commercial filter 50 is to terminate the continuous or periodic updating of information to a reduced-scale presentation for a channel which is within commercial time. As a result, the viewer is able to determine the program which will be shown at the conclusion of the commercial. That is, the viewer can immediately determine which programs are available, even if the programs are within commercials.

The clustering of FIG. 2 may represent program availability during early afternoon hours. On the other hand, the clustering of FIG. 3 may represent program availability during evening hours in which there are fewer daytime dramas and more movies and sporting events. As can be seen by comparing FIGS. 2 and 3, the system 10 of FIG. 1 provides dynamic clustering with respect to the number of reduced-scale presentations in each cluster. As one example, the number of presentations within the "Movies" cluster of FIG. 2 includes only two presentations 30 and 32, while the same cluster is shown as having nine presentations in FIG. 3. The clustering may also be dynamic with respect to the positioning of the clusters. That is, the selection of programs may be tracked and historical information regarding the selections may be stored to provide a basis for determining the order of the five clusters. The reordering may be time-based, so that the clusters are rearranged as a function of the time of day or the day of the week.

The historical information regarding prior user selections may also be used to arrange the appearance of presentations within a cluster. As shown in FIG. 2, each of the five clusters includes overlapping reduced-scale presentations 22–46. In the "Daytime Dramas" cluster, only a minor portion of the presentation 36 is visible. On the other hand, the presentation 40 is completely visible, since it has the appearance of being the foremost presentation. The assignment of which presentation is the foremost presentation within a cluster may be based upon the historical information, under the assumption that the viewer is most likely to select the program that was previously selected under similar circumstances. As an alternative, the presentations within all of the clusters or within only a selected cluster may be periodically rearranged to allow each presentation to cycle to the foremost position. As one example, each presentation (34–40) within the "Daytime Dramas" cluster may be changed from an apparent rearmost position to an apparent foremost position on a cyclical basis. The cycle rate may be user adjustable between upper and lower limits (e.g., between one and ten seconds).

Figure 3:
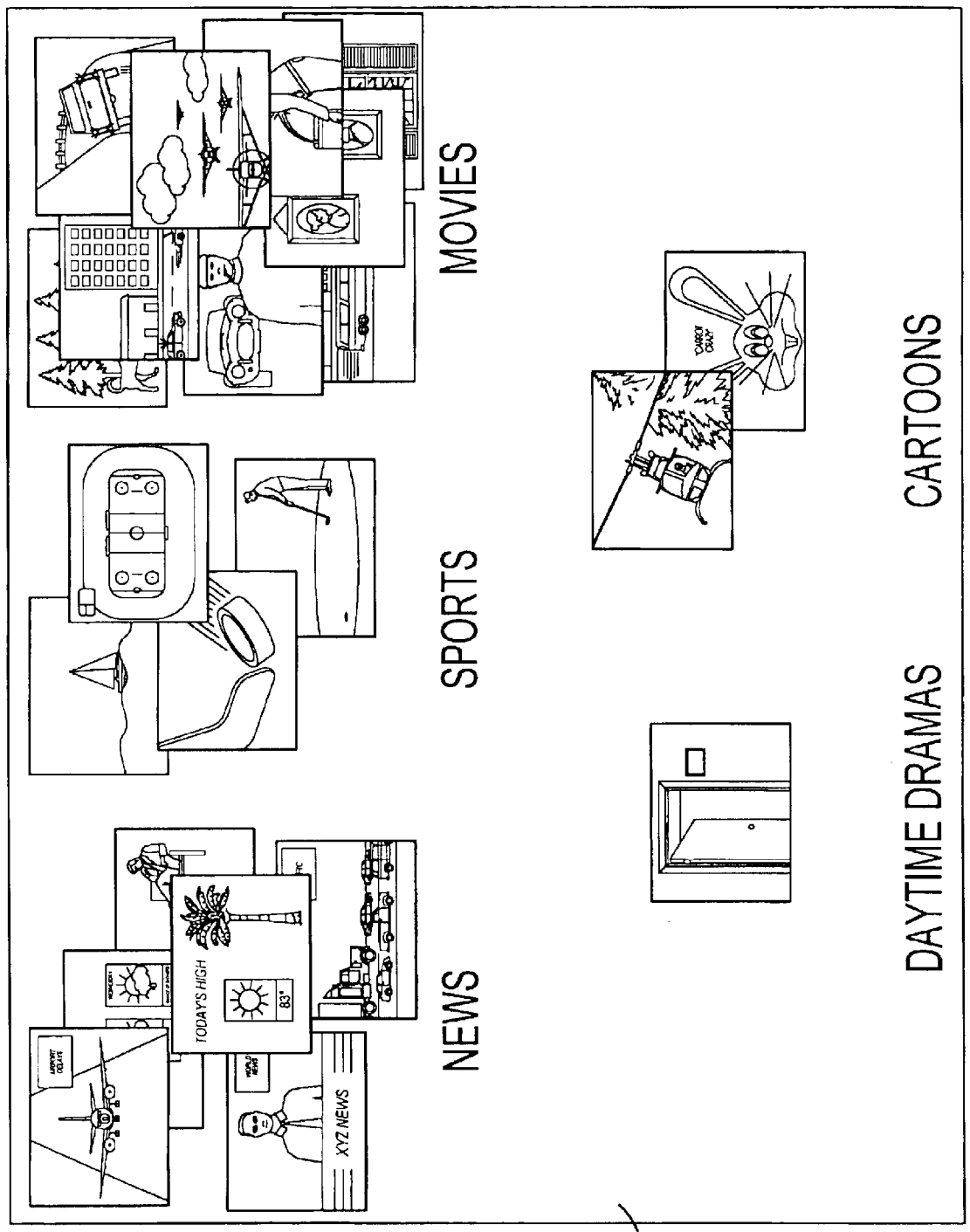
FIG. 3 is an example of the viewing screen of FIG. 2, but at a different time of day, so that there is a different arrangement of real time presentations.

An added available feature of the invention relates to sub-cateogorization. In FIG. 3, there are nine currently available movies within the "Movies" cluster. A viewer may be enabled to split the cluster into sub-clusters, such as the one shown in FIG. 4. Thus, the currently available movies are divided into a "Comedy" sub-cluster, an "Action" sub-cluster, and a "Drama" sub-cluster. This allows the viewer to more easily determine which movie has the greatest personal appeal. Multiple levels of selection are available to the user. Firstly, the user selects the multi-presentation level in which the various clusters of FIG. 3 are presented on the viewing screen of the display 14. The viewer optionally selects the sub-cluster level of FIG. 4. From FIG. 4, the viewer may select a particular movie for full-screen presentation.

The browsing through the clusters and the selection of a program may be achieved using a browsing component 52 and a remote device 54 of FIG. 1. Infrared signaling may be used to provide communication between the browsing component and the remote device. Typically, the remote device is a handheld member that includes browsing buttons. For example, the remote device may include depressable buttons that have differently directed arrow shapes and that trigger infrared signals that manipulate the appearance of the display of reduced-scale presentations. One button may sequentially activate the different clusters, while another button may change the appearance of the presentations within an activated cluster, so that the presentation that appears foremost can be changed by the viewer. When a desired cluster is activated and the presentation that represents the desired program is moved to the forefront, another button on the remote device may be activated to trigger the full screen presentation of the selected program.

Figure 5:
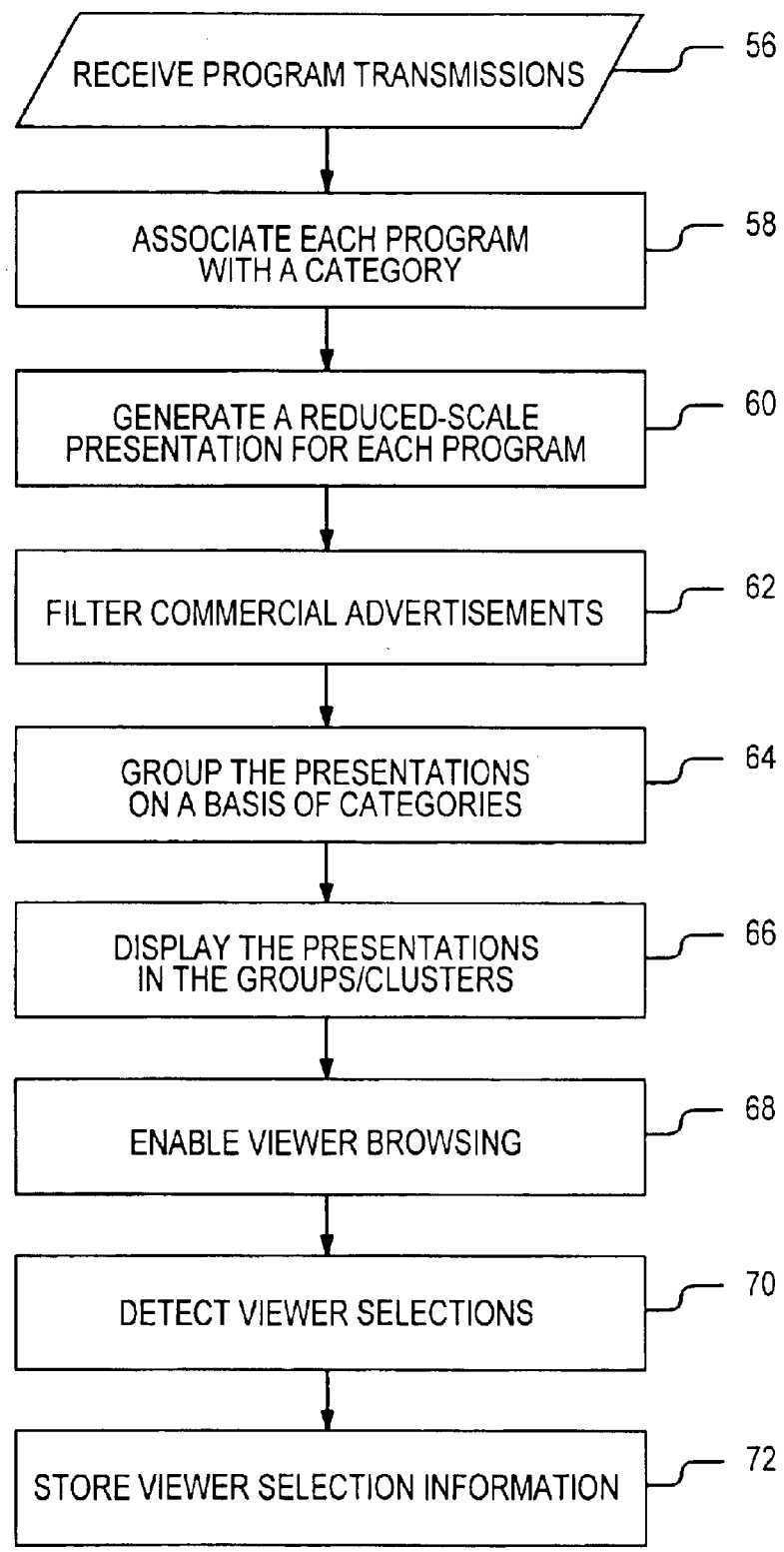
FIG. 5 is a process flow of steps for implementing the invention.

Referring now to FIG. 5, the interface method for viewing and selecting among a variety of commercially available broadcasts includes the step 56 of receiving program transmissions. The program transmissions are contemplated as being television signals from a number of different channels.

At step 58, each program is associated with a category. Five possible categories are shown in FIGS. 2 and 3. However, other categories may be employed. For each program, a reduced-scale presentation is generated at step 60. As a result, "thumbnails" are formed from the different channels. The reduced-scale presentations may be continuously updated, so that all of the programs are simultaneously available for viewing, but at a miniaturized level. Optionally, the commercial advertisements are filtered from the updates, as indicated at step 62.

Figure 4:
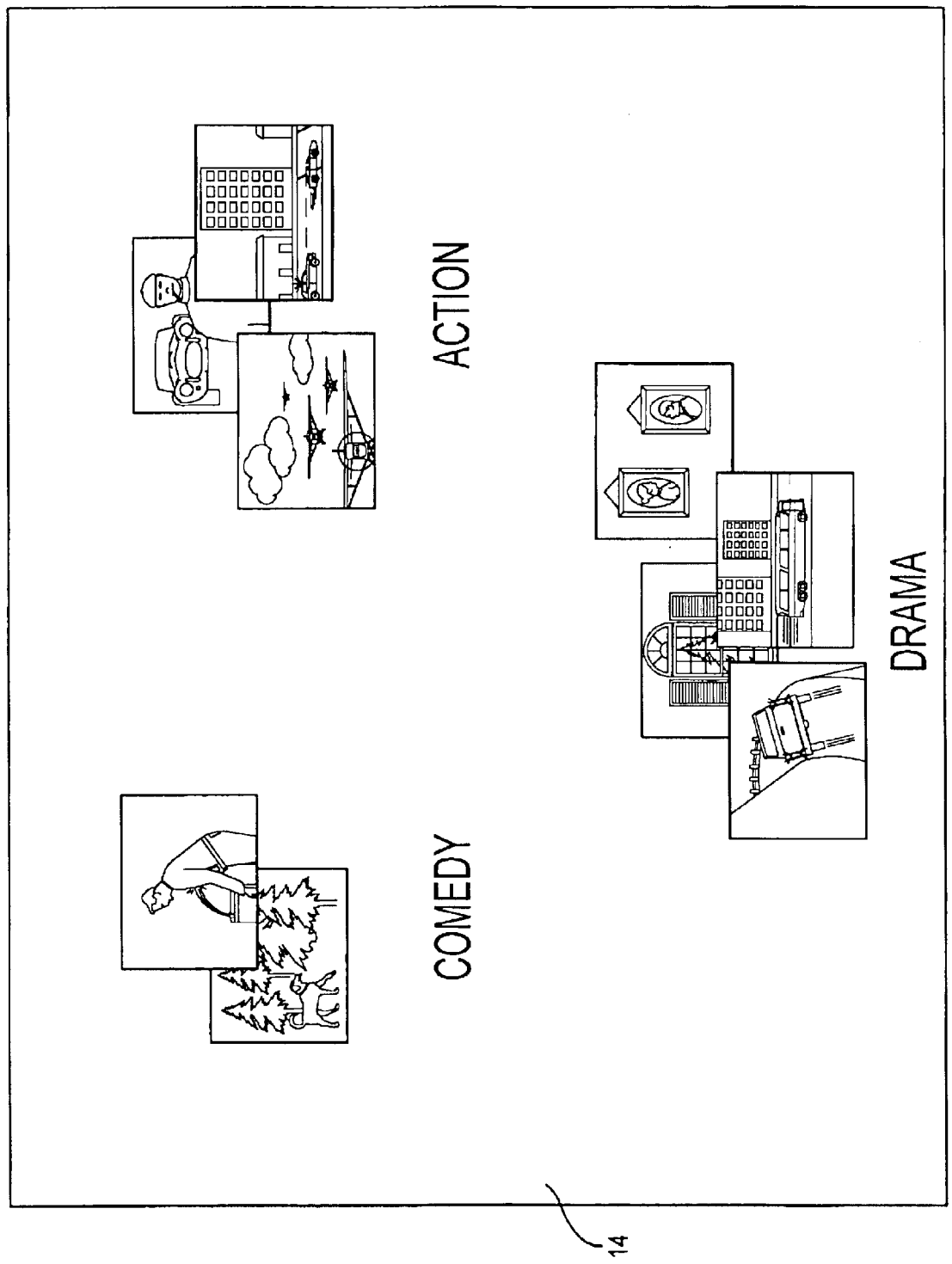
FIG. 4 is an example of sub-categorization of programs in accordance with the invention.

The reduced-scale presentations are grouped at step 64 on the basis of the categorization. The resulting clusters are simultaneously displayed at step 66. FIGS. 2 and 3 are examples of the displays; of the reduced-scale presentations within the different clusters. While not shown, each presentation may include program information, such as the program title and the start and stop times. A viewer browses through the clusters and through the presentations within the clusters using a handheld remote device or any other technique known in the art. This is indicated at step 68. The browsing includes splitting a cluster into sub-clusters, as represented in FIG. 4.

The handheld remote device or similar approach is also used to enable a viewer to select clusters and to select presentations within the clusters. When a presentation is selected for full-screen display, the television or similar device is tuned to the corresponding channel. That is, the system is switched from the viewing-and-selecting mode to a normal-operation mode. Step 70 involves detecting viewer selections. Optionally, the viewer selection information is stored in memory at step 72 for access by the video processor 20 of FIG. 1 for subsequent arrangement of clusters or the arrangement of presentations within the clusters, so that the subsequent displays reflect viewer preferences.

What is claimed is:

1. An interface method for viewing and selecting among a variety of currently available commercial broadcasts comprising the steps of:

determining an association of each said commercial broadcast with a program category of a plurality of program categories; and within a single viewing screen simultaneously presenting video broadcast information in reduced-scale presentations for each of said commercial broadcasts, including:

(1) generating reduced-scale presentations of each of said commercial broadcasts, including locally originating said reduced-scale presentations from full-scale video information for exclusive display on said viewing screen; and (2) dynamically clustering said reduced-scale presentations in correspondence with said program categories, including simultaneously displaying a plurality of clusters of said reduced-scale presentations in which each said cluster includes said reduced-scale presentations for all of said commercial broadcasts associated with said program category that corresponds to said cluster;

thereby utilizing said viewing screen to display each said cluster as a totality of said commercial broadcasts that are currently available within said program category that corresponds to said cluster.

2. The interface method of claim 1 wherein said step of dynamically clustering includes varying a number of said reduced-scale presentations in said clusters as a function of changes in said commercial broadcasts.

3. The interface method of claim 2 wherein said commercial broadcasts are television broadcasts carried via television channels, said step of determining said association for each said commercial broadcast including monitoring reception of said television channels at a location of said viewing screen to detect tag information that is specific to current programs available via said television channels.

4. The interface method of claim 1 further comprising a step of enabling a user to initiate a genre-dividing mode in which at least one said cluster is split into separate sub-clusters on a basis of genres.

5. The interface method of claim 4 wherein said step of enabling said user includes providing cluster splitting into said sub-clusters on the basis of different sports and on the basis of different movie genres.

6. The interface method of claim 1 wherein said step of presenting said video broadcast information includes overlapping said reduced-scale presentations within at least one said cluster, said interface method further comprising steps of:

(1) enabling a user to select which said reduced-scale presentation in said at least one cluster has the appearance of being the foremost reduced-scale presentation; and (2) enabling said user to select any said reduced-scale presentation in any said cluster for viewing in a full-screen mode of operation.

7. The interface method of claim 6 further comprising steps of:

maintaining historical information regarding user selections; and arranging said clusters and arranging said reduced-scale presentations within said clusters as a function of said historical information.

8. The interface method of claim 1 wherein said step of generating said reduced-scale presentations includes displaying incoming television programs in real time, such that said reduced-scale presentations in each said cluster are miniaturized displays which are in constant synchronization with said television programs.

9. An interface method for viewing and selecting among a variety of television channels comprising the steps of:

receiving program transmissions at a particular site via said television channels, each said program transmission being defined by video signals currently available via a particular associated one of said television channels;

recurringly identifying a program category for each said television channel on a basis of a currently available program being broadcast via said television channels, said identifying occurring at said particular site;

originating reduced-scale presentations of each said currently available program from said video signals received via said television channels so as to enable viewing of said currently available programs, said reduced-scale presentations being a manipulation of said video signals that is original to said particular site;

displaying each said presentation on a single screen at said particular site, including grouping said presentations on a basis of said program categories, thereby simultaneously displaying a number of groups that corresponds to the number of program categories, with each well populated group having overlapping presentations;

enabling a viewer to remotely control browsing through said groups and browsing among said presentations within a specific group; and enabling said viewer to select a particular said presentation for full-screen viewing of the program from which said particular presentation was originated, wherein each selection for said full-screen viewing is exclusive to said single screen.

10. The interface method of claim 9 further comprising a step of arranging said groups and said presentations within said groups as a function of historical information that is representative of prior selections by said viewer.

11. The interface method of claim 9 further comprising a step of enabling said viewer to selectively increase or decrease said number of groups by increasing or decreasing said number of program categories.

12. The interface method of claim 11 wherein said step of enabling increases includes providing cluster splitting according to genres and includes merging previously split clusters.

13. The interface method of claim 9 wherein said originating is a miniaturization of each said currently available program such that said displaying enables continuous viewing of said program transmissions but at a miniaturized level.

14. A system for viewing and selecting among a variety of currently available commercial broadcasts comprising:

a detector configured to identify each said commercial broadcast with a program category of a plurality of program categories;

a video processor connected to receive said commercial broadcasts and configured to output reduced-scale presentations of said commercial broadcasts, said reduced-scale presentations being continuously updated video broadcast information; and a viewing screen cooperative with said detector and said video processor to simultaneously said reduced-scale presentations in clusters that have a one-to-one correspondence with said program categories, with all of said commercial broadcasts that are identified with one of said program categories being simultaneously displayed, said video processor and said viewing screen being operatively associated such that said reduced-scale presentations are available exclusively for said viewing screen.

15. The system of claim 14 wherein said video processor is configured to continuously update said video broadcast information relevant to each said reduced-scale presentation, such that said reduced-scale presentations are ongoing displays of said commercial broadcasts in real time.

16. The system of claim 14 further comprising memory connected to store historical information indicative of selections of said commercial broadcasts by a viewer, said memory being accessed by said video processor to control arrangement of said clusters and said reduced-scale presentations within said clusters as a function of said historical information.

17. An interface method for viewing and selecting among a variety of currently available commercial broadcasts comprising the steps of:
  determining an association of each said commercial broadcast with a program category of a plurality of program categories; and
  within a single viewing screen, simultaneously presenting video broadcast information in reduced-scale presentations for each of said commercial broadcasts, including:
  (1) generating reduced-scale presentations of each of said commercial broadcasts, said reduced-scale presentations being based on said video broadcast information; and
  (2) dynamically clustering said reduced-scale presentations in correspondence with said program categories, including simultaneously displaying a plurality of clusters of said reduced-scale presentations in which each said cluster includes said reduced-scale presentations for all of said commercial broadcasts associated with said program category that corresponds to said cluster;
  thereby utilizing said viewing screen to display each said cluster as a totality of said commercial broadcasts that are currently available within said program category that corresponds to said cluster:
  wherein said step of presenting said video broadcast information includes overlapping said reduced-scale presentations within at least one said cluster, said interface method further comprising steps of:
  (a) enabling a user to select which said reduced-scale presentation in said at least one cluster has the appearance of being the foremost reduced-scale presentation;
  (b) enabling said user to select any said reduced-scale presentation in any said cluster for viewing in a full-screen mode of operation; and
  (c) cycling an arrangement of said overlapping reduced-scale presentations in said at least one cluster such that each said overlapping reduced-scale presentation is periodically said foremost reduced-scale presentation.

18. A system for viewing and selecting among a variety of currently available commercial broadcasts comprising:
  a detector configured to identify each said commercial broadcast with a program category;
  a video processor connected to receive said commercial broadcasts and configured to output reduced-scale presentations of said commercial broadcasts, said reduced-scale presentations being video broadcast information, said video processor being configured to continuously update said video broadcast information relevant to each said reduced-scale presentation;
  a commercial filter enabled to detect commercials and to inhibit said continuous updating during commercial times; and
  a viewing screen cooperative with said detector and said video processor to simultaneously display sain reduced-scale presentations in clusters that have a one-to-one correspondence with said program categories, with all of said commercial broadcasts that are identified with one of said program categories being simultaneously displayed.

19. An interface method for viewing and selecting among a variety of currently available commercial broadcasts comprising the steps of:
  determining an association of each said commercial broadcast with a program category of a plurality of program categories; and
  within a single viewing screen, simultaneously presenting video broadcast information in reduced-scale presentations for each of said commercial broadcasts, including:
  (1) generating reduced-scale presentations of each of said commercial broadcasts, including locally originating said reduced-scale presentations from full-scale video information for exclusive display on said viewing screen; and
  (2) dynamically clustering said reduced-scale presentations in correspondence with said program categories, including simultaneously displaying a plurality of clusters of said reduced-scale presentations in which each said cluster includes said reduced-scale presentations for all of said commercial broadcasts associated with said program category that corresponds to said cluster;
  thereby utilizing said viewing screen to display each said cluster as a totality of said commercial broadcasts that are currently available within said program category that corresponds to said cluster;
  wherein said step of generating said reduced-scale presentations includes:
  (a) displaying incoming television programs in real time, such that said reduced-scale presentations in each said cluster are miniaturized displays which are in constant synchronization with said television programs; and
  (b) filtering television commercials, such that said reduced-scale presentations are static during said television commercials.

* * * * *